E. L. LINXWEILER.
IRRIGATING CONDUIT.
APPLICATION FILED NOV. 30, 1914.
Reissued Mar. 7, 1916. 14,081.
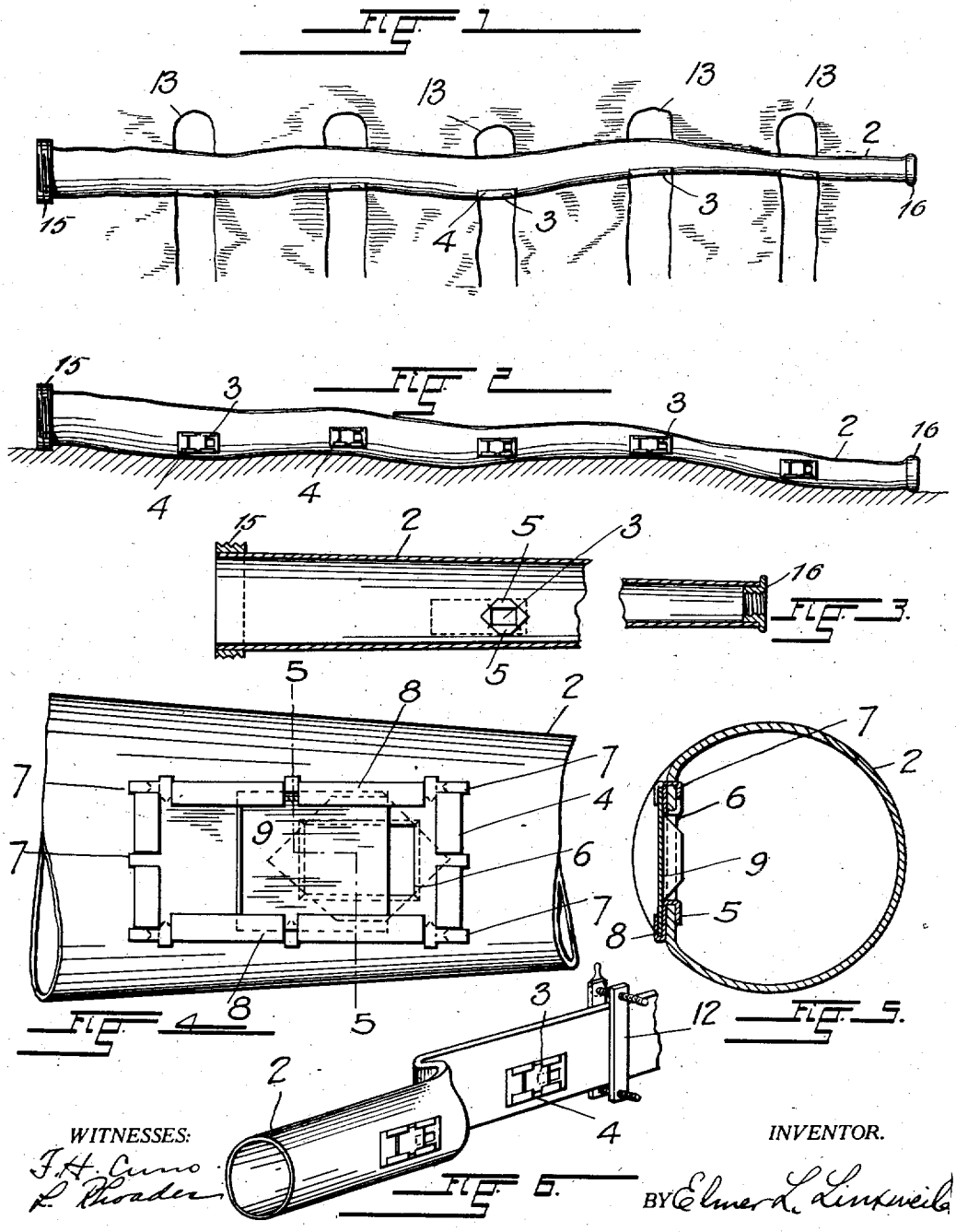

UNITED STATES PATENT OFFICE.

ELMER L. LINXWEILER, OF DENVER, COLORADO.

IRRIGATING-CONDUIT.

14,081. Specification of Reissued Letters Patent. Reissued Mar. 7, 1916.

Original No. 1,043,118, dated November 5, 1912, Serial No. 690,603. Application for reissue filed November 30, 1914. Serial No. 874,935.

*To all whom it may concern:*

Be it known that I, ELMER L. LINXWEILER, a citizen of the United States, residing at Denver, in the county of Denver and State of Colorado, have invented a new and useful Irrigating-Conduit, of which the following is a specification.

My invention relates to a new and useful device for the distribution of water into irrigating ditches, commonly known as furrows, on farm lands, orchards, etc., and its primary object resides in the provision of a portable hose of suitable size and form which in one of its sides has outlets through which water introduced into an end of the hose is laterally distributed into preëstablished ditches.

Another object of my invention resides in providing in a hose of the above type, means for regulating the flow of liquid through its outlet openings, and still further objects of my invention are to provide a hose of the character mentioned, which tapers and is open at both ends to insure a steady, uninterrupted flow of liquid and to prevent accumulation of dirt and other obstructive matter, which is flexible so as to conform with undulations of a surface on which it is placed; and which is pliable so that the flow of liquid through it can be dammed at any point, and so that the hose can be rolled or folded when not in use.

An embodiment of my invention has been illustrated in the accompanying drawings in the various views of which like parts are similarly designated, and in which, Figure 1 is a plan view of my irrigating device in its operative position with relation to a system of irrigating ditches, Fig. 2, a side elevation of the device as shown in Fig. 1, Fig. 3, an enlarged longitudinal section through the end portion of the hose, Fig. 4, an enlarged elevation of a portion of the hose showing the construction of the means provided to regulate the flow through its outlets, Fig. 5, a transverse section taken along the line 5—5, Fig. 4, and Fig. 6, a perspective view of a portion of the hose in a partially collapsed condition.

Referring to the drawings by numerical reference characters, 2 designates a hose preferably made of canvas and constructed to provide an open-ended conduit of tapering form. The hose is provided at intervals with outlets formed by openings 3 in one of its sides, for the lateral distribution of liquid introduced into the hose at one of its ends. Protective plates 4 placed exteriorly of the hose have openings 5 which register with the outlet openings 3, integral lips 6 which are bent inwardly over the edges of the said outlet openings and prongs 7 which are inserted through apertures in the conduit and bent upon the inner surface of the same to secure the plates in place. Flanges 8 formed integral with the plates at their longitudinal edges are bent upon the exterior surfaces of the same to provide guide ways for sliding gates 9 which serve to regulate the flow of liquid through the respective outlets.

The hose being made of canvas, is flexible so as to conform with the undulations of a surface upon which it is placed as shown in Figs. 1 and 2, and it is pliable so that it may be rolled when not in use, or clamped by a suitable device such as that shown at 12 in Fig. 6, to obstruct the flow of liquid between any two of its outlets, for the purpose of discontinuing the distribution of water at any point in the hose beyond which it is not required, or to increase the volume of water discharged through the openings in the hose ahead of this point.

The hose tapers so that the water will be distributed in streams of substantially equal volume through the various openings. It is open at its largest end for connection with a source of water supply, and it tapers and is open at its opposite end to permit of an uninterrupted continuous and steady flow of water and to prevent an accumulation of sand, stones and other obstructive matter. The outlets of the hose are made in one side of the hose and at no other place or places so that the water will flow laterally from the same.

It should be understood that the water is not emitted from the hose in jets or sprays as in an ordinary sprinkling hose, but that it flows in steady streams into the ditches which previously have been formed in the soil as shown at 13 in Fig. 1, to conduct the water along the places to be irrigated; that to prevent accumulation of dirt and obstructive matter and thereby insure the even distribution of the water, an open-ended tapering hose is desirable; that the pliability of the hose is essential to permit of its being moved from place to place and to readily and quickly obstruct the flow of water between any two outlets, and that the flexibility of the hose is in most every instance, necessary to cause it to conform with the undulations of the ground on which it is placed, or to enable it to curve in conformity with the line in which lie the mouths of the ditches into which the water is to be distributed.

The plates 4 fastened exteriorly of the hose not only provide a convenient medium for the application of the gates but also protect the edges of the openings against wear and tear.

It will furthermore be understood without further illustration that to irrigate extensive areas the hose may be made in sections which are connected end to end by means of male and female couplings designated in Figs. 1, 2 and 3 of the drawings, respectively by the numerals 15 and 16.

Having thus described my invention what I claim and desire to secure by Letters Patent is:

1. A device for use in irrigating land by ditches, comprising a hose having at suitable intervals, outlets for the lateral outflow of water into preëstablished channels, plates placed exteriorly of said hose, and having openings registering with said outlets, and lips bent inwardly around the edges of the same, and gates movably mounted on said plates to regulate the flow of water through the said openings.

2. A device for use in irrigating land by ditches, comprising a hose having at suitable intervals, outlets for the lateral outflow of water into preëstablished channels, plates placed exteriorly of said hose, and having openings registering with said outlets, lips bent inwardly around the edges of the same, and exterior parallel guide-ways, and gates slidably mounted in said ways for regulating the flow of water through the said openings.

3. A flexible irrigating conduit for distributing water into furrows, apertures in said conduit spaced apart at suitable distances to communicate with the furrows, and one for each furrow, a plate fitted over each aperture and provided with an opening registering with said aperture, tongues projecting from said plate, said tongues extending through the aperture and being turned down upon the interior surface of the conduit to secure the plate to said conduit, and a slide movable in said plate to open and close the opening in the plate to regulate the flow of water therethrough, said conduit tapering throughout its length to insure an even distribution of water through said apertures, substantially as described.

In testimony whereof I have affixed my signature in the presence of two witnesses.

ELMER L. LINXWEILER.

Witnesses:

L. Rhoades,

F. H. Cuno.